J. B. POSPESHIL.
SPRING ATTACHMENT FOR MOTOR VEHICLES.
APPLICATION FILED NOV. 1, 1917.

1,272,520.

Patented July 16, 1918.
2 SHEETS—SHEET 1.

Inventor
Joseph B. Pospeshil

By Whittemore Hulbert & Whittemore
Attorneys

J. B. POSPESHIL.
SPRING ATTACHMENT FOR MOTOR VEHICLES.
APPLICATION FILED NOV. 1, 1917.
1,272,520.
Patented July 16, 1918.
2 SHEETS—SHEET 2.
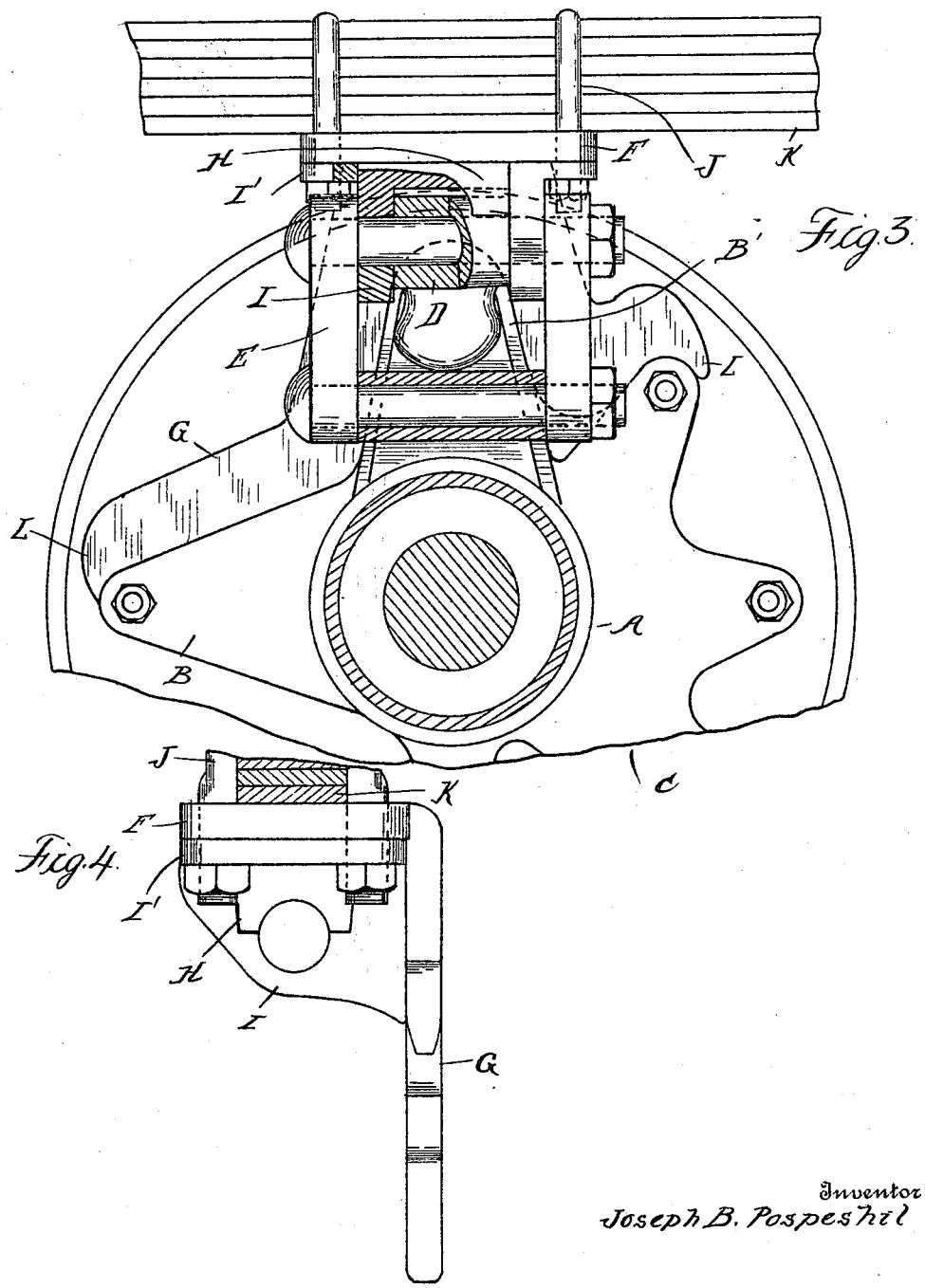

UNITED STATES PATENT OFFICE.

JOSEPH B. POSPESHIL, OF DETROIT, MICHIGAN.

SPRING ATTACHMENT FOR MOTOR-VEHICLES.

1,272,520.  Specification of Letters Patent. Patented July 16, 1918.

Application filed November 1, 1917. Serial No. 199,783.

*To all whom it may concern:*

Be it known that I, JOSEPH B. POSPESHIL, a citizen of the United States of America, residing at Detroit, in the county of Wayne and State of Michigan, have invented certain new and useful Improvements in Spring Attachments for Motor-Vehicles, of which the following is a specification, reference being had therein to the accompanying drawings.

The invention relates to auxiliary spring attachments for motor vehicles, and comprises the novel construction as hereinafter set forth.

In the drawings:

Fig. 3 is a sectional elevation at right angles to Fig. 1; and

Fig. 4 is an elevation of Fig. 1.

Figure 1:
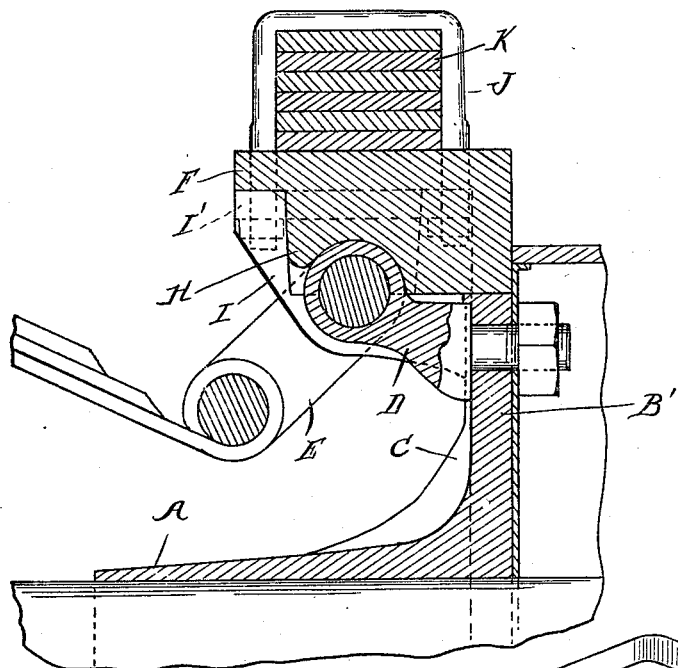
Figure 1 is a section in the plane of the axle and spring, showing the auxiliary spring support.
Figure 2:
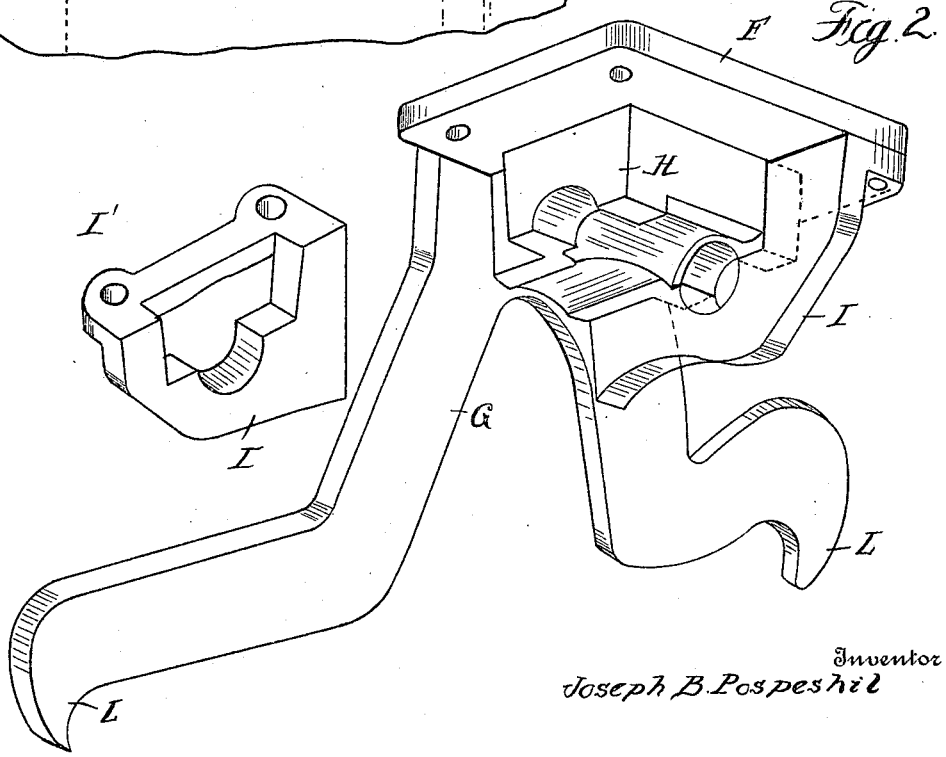
Fig. 2 is a perspective view of the auxiliary spring support.

My improvement is applicable to that type of motor vehicles in which the main spring suspension for the body is formed by a transverse extending spring arranged substantially in the plane of the axle and supported by shackles from brackets at the axle ends. It is the object to provide means of supporting side springs extending longitudinally of the vehicle without the necessity of changing the axle construction or the boring of holes for securing bolts. As specifically shown my attachment is designed for use on a specific construction of axle, viz., one in which the axle housing A is provided with flanged ends B forming the brake-head C. The flange B is also provided with an upwardly-extending portion B' having the inwardly-extending bracket D for engagement with the shackles E. The attachment comprises a shelf member F which has a downwardly-extending flange G bifurcated and fashioned to conform to the contour of the flange B and upward extension B' thereof, and resting upon the ledge formed by said flange with its outer face adjacent to the brake-head C. To hold the shelf in this position it has formed on the underside thereof a concave bearing H for fitting over the shackle bracket D. I are straps for complementary bearing members engaging the underside of the end portions of said shackle bracket and provided with laterally-extending flanges I' which are clamped to the underside of the member F. The securing bolts for the flanges I' are formed at the ends of V-shaped clip members J, which perform the further function of embracing a leaf-spring K supported upon the shelf. The ends of this leaf-spring may be attached to the body by any suitable supporting shackles, and thus the load on the body is partly transmitted through the spring K into the shelf F which in turn is supported by the shackle bracket D.

It will be noted that the shelf is secured in position solely by the clamping of the strap members I and the engagement of the bifurcated arms G with the ledge on the flange B, these serving to hold the shelf from turning. There are no clamping bolts for directly securing the shelf to the brakehead, but the fact that the bifurcated flange G rests upon the ledge will relieve the shackle-bracket from a large portion of the load, this being carried directly into the flange B. The ends of the furcations of the member G are preferably hooked, as indicated at L, so as to hold the device from endwise movement, which relieves the bracket D of stresses incident to the inertia of stopping or starting.

My attachment may be quickly applied to the standard make of motor vehicle, and when in place will furnish side springs for supporting the body in addition to the transversely-extending rear spring. This will greatly increase the load carrying capacity of the truck, and the stresses transmitted through the auxiliary spring are carried directly into the brake-head and to the supporting wheels without increasing stresses upon the axle.

What I claim as my invention is:

1. In a motor vehicle, the combination with the axle housing having a flanged end forming a brake-head, of an auxiliary spring support secured to said head and having a bearing on the ledge formed by the edge of said flange.

2. In a motor vehicle, the combination with the axle housing having a flanged end forming a brake-head and a shackle supporting bracket projecting inward from said flange, of an auxiliary spring support clamped to said shackle bracket and having a bearing on the ledge formed by the upper edge of said flange.

3. In a motor vehicle, the combination with the axle housing forming a brake-head and a shackle bracket projecting inward from said brake head, of an auxiliary spring support seated upon said bracket, and means for clamping said support upon said seat.

4. In a motor vehicle, the combination with the axle housing having a brake-head at the end thereof and an inwardly-extending shackle supporting bracket, of an auxiliary spring support comprising a shelf with a bearing on the underside thereof seated on said shackle bracket, clips for securing a spring upon said support, and means for clamping said support on said bracket secured by said clips.

5. In a motor vehicle, the combination with the axle housing having a brake-head at the end thereof and a shackle bracket extending inward from said brake-head, of an auxiliary spring support comprising a shelf having a downwardly-extending flange adjacent to the inner face of said brake-head and also having a bearing for seating upon said shackle bracket, a clip for securing a spring to said shelf, and means secured by said clip for clamping said shelf on said bracket.

6. In a motor vehicle, the combination with the axle housing having a flanged end forming a brake-head and a shackle supporting bracket extending inward from said flange, of a spring support comprising a shelf having a downwardly extending flange fashioned to conform to the edge contour of the flange on the axle and resting on the ledge formed thereby, a bearing on the underside of said shelf seated upon said bracket, clips for securing a spring to said shelf, and straps for clamping said shelf to said bracket secured by said clips.

In testimony whereof I affix my signature.

JOSEPH B. POSPESHIL.

Copies of this patent may be obtained for five cents each, by addressing the "Commissioner of Patents, Washington, D. C."